(12) United States Patent
den Hartog et al.

(10) Patent No.: US 12,255,833 B1
(45) Date of Patent: Mar. 18, 2025

(54) VISIBILITY PODS FOR NETWORK TRAFFIC

(71) Applicant: Amazon Technologies, Inc., Reno, NV (US)

(72) Inventors: Peter den Hartog, Rotterdam (NL); Pablo Nahuel Lago Caraballo, Dublin (IL); Alan Reddy, Cork (IL); Panagiotis Irakleous, Dublin (IL); Fahri Yardimci, Dublin (IL)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 18/060,743

(22) Filed: Dec. 1, 2022

(51) Int. Cl.
*H04L 47/80* (2022.01)
*H04L 9/40* (2022.01)
*H04L 47/125* (2022.01)
*H04L 47/70* (2022.01)

(52) U.S. Cl.
CPC .......... *H04L 47/801* (2013.01); *H04L 47/125* (2013.01); *H04L 47/822* (2013.01); *H04L 63/1416* (2013.01)

(58) Field of Classification Search
CPC ... H04L 47/801; H04L 47/125; H04L 47/822; H04L 63/1416
See application file for complete search history.

(56) References Cited

U.S. PATENT DOCUMENTS

| | | | | |
|---|---|---|---|---|
| 9,166,992 | B1* | 10/2015 | Stickle | H04L 63/1408 |
| 11,416,587 | B1* | 8/2022 | den Hartog | G06F 8/61 |
| 11,418,520 | B2* | 8/2022 | Mehta | H04L 63/1416 |
| 2006/0034202 | A1* | 2/2006 | Kuure | H04L 12/189 |
| | | | | 370/312 |
| 2006/0059163 | A1* | 3/2006 | Frattura | H04L 43/00 |
| 2017/0041206 | A1* | 2/2017 | Maes | G06F 9/45533 |
| 2018/0123907 | A1* | 5/2018 | Raman | H04L 47/822 |
| 2018/0159898 | A1* | 6/2018 | Gibson | H04L 63/0263 |
| 2019/0052532 | A1* | 2/2019 | Chen | H04L 41/0895 |
| 2022/0182403 | A1* | 6/2022 | Mistry | H04L 63/20 |

\* cited by examiner

*Primary Examiner* — Joe Chacko
(74) *Attorney, Agent, or Firm* — Hogan Lovells US LLP

(57) ABSTRACT

Approaches presented herein relate to visibility into network traffic associated with one or more groups of network resources. Approaches provide for automatic deployment and configuration of one or more visibility pods for individual groups of networked resources. A visibility pod may include at least one virtual compute instance to execute at least one analytical tool or application. A copy of network traffic for the monitored resources can be directed to an endpoint for a respective visibility pod, which can extract information (e.g., specific metadata about the traffic) to be analyzed by the analytical tools or applications. The results of the analysis can be written to a log file and/or data repository, and in some instances may be used to generate security alerts or other such notifications. A visibility pod can be automatically deployed and configured for any group of networked resources from which network traffic can be directed.

20 Claims, 9 Drawing Sheets

VISIBILITY PODS FOR NETWORK TRAFFIC

BACKGROUND

Security is of significant importance in many network-connected environments where users or resources have the ability to access potentially untrusted resources or sources of content. Accordingly, many network security systems attempt to monitor or otherwise obtain at least some visibility into actions taken with respect to external resources outside a secure or trusted environment. This can include obtaining information about any network traffic sent from, or received to, a trusted environment, where that information may include, or relate to, the source address, destination address, communication protocol, or type of communication, among other such options, where the monitored information may not include any of the actual content of the communication. For large or complex environments, however, it can be complicated to configure the appropriate monitoring systems or services to obtain or provide such visibility. These complications can be exacerbated in an environment, such as a cloud environment, where there may be many logically separated environments that are running on shared resources and infrastructure.

BRIEF DESCRIPTION OF THE DRAWINGS

Various embodiments in accordance with the present disclosure will be described with reference to the drawings, in which.

DETAILED DESCRIPTION

Approaches described and suggested herein relate to providing visibility into network traffic associated with one or more groups of networked resources. In particular, various approaches provide for the automatic deployment and configuration of one or more visibility pods for individual groups of networked resources. A visibility pod may include, for example, a visibility interface and one or more virtual compute instances or virtual machines (or physical machines in some embodiments) that can execute one or more analytical tools or applications. A virtual (or physical, in some embodiments) component, such as a virtual router or load balancer, for example, can direct a copy of the network traffic for a group of monitored resources to an endpoint for a respective visibility pod, which can extract the relevant information (e.g., specific metadata about the traffic) to be analyzed by the analytical tools or applications. This specific metadata may include, for example, data such as source address, destination address, and communication protocol, among other such options. The results of the analysis can be written to a log file and/or data repository, and in some instances may be used to generate security alerts or other such notifications. Such a deployment system or service can automatically deploy and configure virtual infrastructure for a group of networked resources. In some instances, visibility tools can be provided using containers with pre-configured software. The visibility pods, and associated configuration and infrastructure, can automatically scale and update with the group of resources, and can handle multiple isolated (or at least logically separated) groups of resources, which may each be quite large or complex in nature. In many instances, after requesting for a group of resources to be monitored (or requesting allocation of resources that are to be monitored), the network traffic for those monitored resources simply needs to be pointed to the appropriate gateway load balancer or endpoint, with all other allocation and configuration being handled by the visibility system or service automatically.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
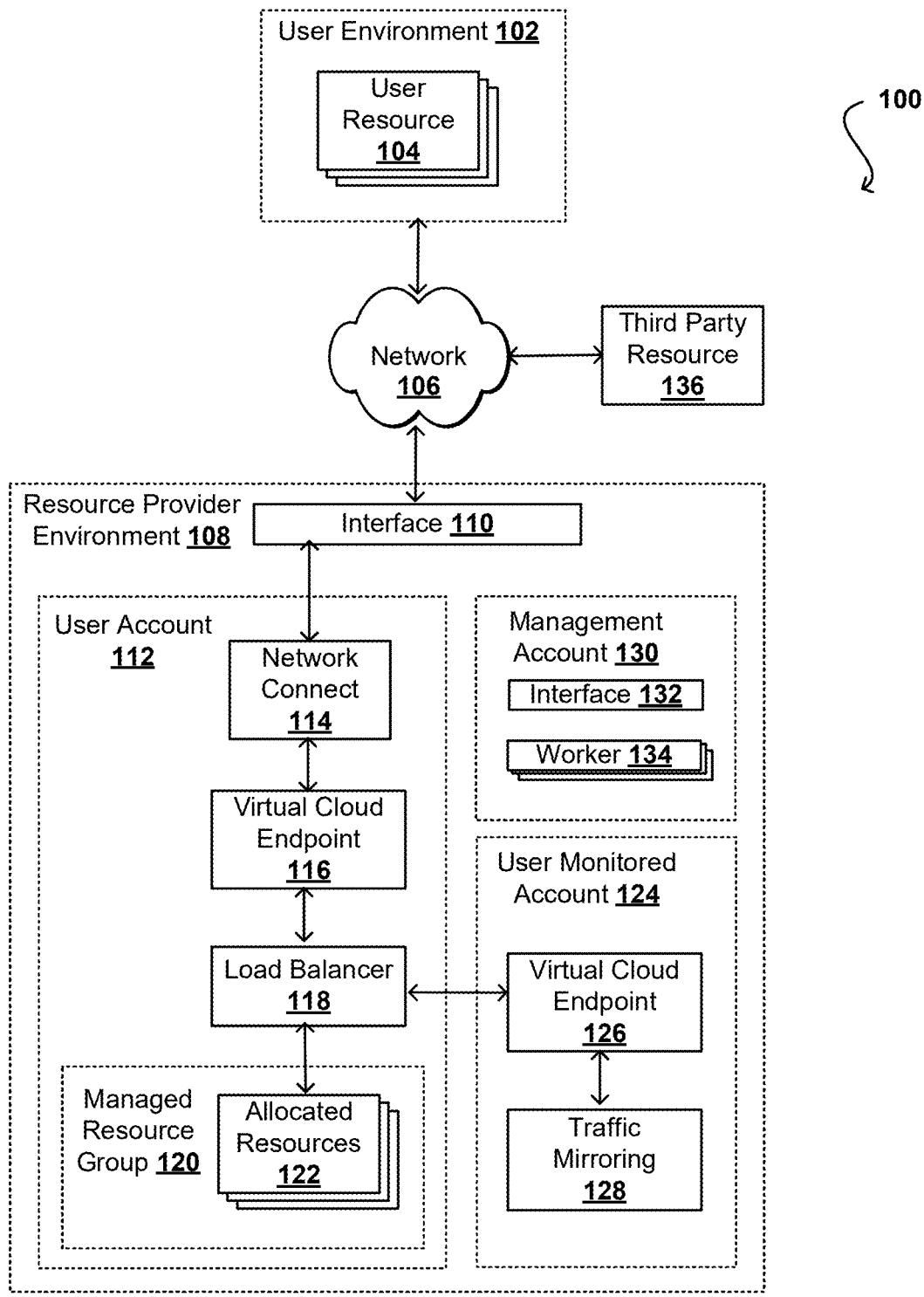
FIG. 1 illustrates an example system for providing visibility into network traffic for a group of resources that can be used in accordance with various embodiments.

FIG. 1 illustrates an example network configuration 100 wherein a user may utilize a set of user resources 104 (e.g., servers, databases, and other computing, networking, or electronic devices) in a user environment 102, such as may be operated on a premises of a user. These user resources 104 may be able to communicate over at least one wired or wireless network 106, such as the Internet, a local area network (LAN), a peer network, a cellular network, and the like. These communications may involve resources of a resource provider environment 108, such as resources 122 (e.g., physical or virtual compute instances or machines) that may be allocated for use by (or on behalf of) the user as part of a managed resource group 120 within a portion of the resource provider environment 108 associated with a user account 112. In a shared or hosted resource environment, such as a cloud environment, such an approach (as discussed in more detail later herein) can enable a user to utilize at least the allocated resources 122 of the resource provider environment 108 in addition to the user resources 104 of the on-premises user environment 102. The user resources 104 and allocated resources 122 may communicate with each other over the at least one network 106, or can communicate with other resources or data sources, such as a third party resource 136.

As mentioned, once communications or other network traffic pass outside a secure or trusted environment, there may be some security risks associated with those communications. There may also be reasons to monitor traffic within a trusted environment which may nor not be related to security. Accordingly, it may be desirable to monitor, or at least gain some visibility into, the traffic passing to, from, or within the user environment 102 or the user account 112. In the case of the allocated resources 122 of the user account 112, these resources may scale or change over time, and may represent a large allocation of disparate resources. Various prior approaches to gaining visibility into the network traffic for such environments, groups, or allocations generally required manual configuration which was often complicated and did not scale particularly well.

Approaches in accordance with various embodiments provide for the automated deployment and management of visibility pods (including one or more physical or virtual resources) for various different types of networked resource or computing environments. As an example, in the system 100 of FIG. 1, a user may request an allocation of resources 122 in a customer account, and one or more services in the resource provider environment 108 can automatically allocate and configure those resources on behalf of the user, such as through use of an adjustable managed resource group 120. The allocated resources 122 can be accessed through a load balancer 118, such as a gateway load balancer, via a virtual cloud (or other such) endpoint 116. A gateway load balancer can be used to deploy, scale, and manage virtual appliances, such as firewalls, threat detection systems, and deep packet inspection systems. In addition to the virtual cloud endpoint 116 through which the allocated resources 122 can be accessed, the load balancer 118 can also communicate with another virtual cloud endpoint 126 of a user monitored account 124. This user monitored account 124 can also include one or more traffic mirroring components 128 for a traffic mirroring session, which can extract and capture metadata from network communications occurring for (at least specified) resources of a user account. As illustrated, this virtual cloud endpoint 126 and traffic mirroring component(s) 128 for a mirroring session live in a separate user account. The traffic mirroring component(s) 128 can be pointed to the appropriate load balancer 118 for the user-allocated resources 122, using the virtual cloud endpoint 126. The allocated resources 122 can perform processing for the network traffic while the metadata for the traffic can be extracted and stored from the user monitored account 124.

In this example, there may be resources allocated for use by a management account 130 to provide and configure visibility services for user monitored accounts 124 or other such environments, allocations, or groupings. Resources of the management account 130 can include a management interface, which can be used to provide an interface 110 (e.g., API) or wizard enabling a user to request, initiate, or configure aspects of the user-monitored account. The resources of the management account 130 can also include one or more workers 134, such as virtual machine instances that may be allocated to perform specific tasks, such as to create resources; generate new sites, accounts, or environments, or configure various components of these allocations, such that visibility pods are automatically allocated and configured for a specified environment, site, account, or grouping. In the case of a wizard, a user may provide input for a series of questions or prompts, and that information can be used with a sequence of API calls to generate and configure the user account 112 and/or user monitored account 124. The user can then connect to, and communicate using, the account that is to be monitored. All creation and configuration of infrastructure for obtaining the desired visibility can be performed automatically by the management service in this example. The management service can also manage and automatically adjust allocations and configurations to provide visibility as the customer account changes over time, including changes in scale or composition. The user does not have to do anything manually to help manage these adjustments, but instead can just connect to the customer account and send all traffic to the appropriate endpoint in order to obtain end-to-end visibility at scale. In at least one embodiment, the management account 130 can be provided using a management control plane, such as an Eithne control plane to obtain network visibility, which can communicate with the appropriate endpoint to expose the appropriate network traffic metadata. In FIG. 1, a network connection component 114 can enable the on-prem user resources 104 of the user environment 102 to communicate with the virtual cloud endpoint 116 of the user account 112 in the resource provider environment 108, and the load balancer and virtual cloud endpoint 126 of the user-monitored account enable the traffic to be monitored using a traffic mirroring component 128 that is automatically configured and scaled as appropriate, regardless of scale.

Figure 2:
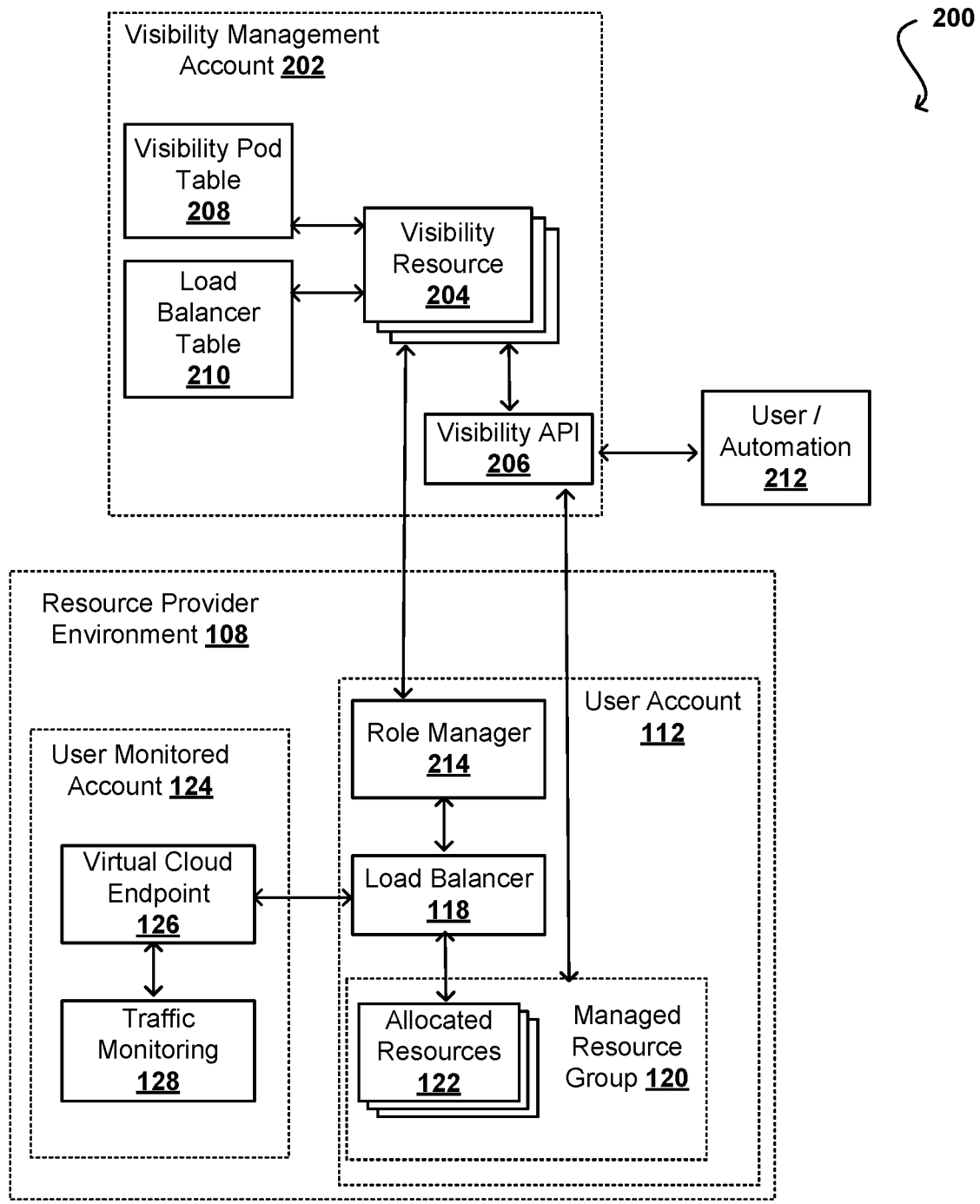
FIG. 2 illustrates a visibility management system that can be used to manage resource visibility in accordance with various embodiments.

FIG. 2 illustrates another view of resources 200 in the resource provider environment. In this example, the visibility management account 202 (which may correspond to management account 130 in FIG. 1) can include a visibility resource table 208 and a load balancer table 210 for storing information for the appropriate visibility resources 204 of the visibility management account 202 that is used to configure and manage the user-monitored account 124. It should be understood that reference numbers may be carried over similar components or elements between figures for simplicity of explanation, but such usage should not be interpreted as a limitation on the scope of the various embodiments unless otherwise specifically stated. As mentioned, the visibility resources 204 can communicate with the user-allocated resources 122 using a visibility API 206, which is also exposed to the corresponding user system or automation. The visibility resources can also communicate with a role manager 214 for the user account 112, which can help to determine the resources for which traffic should be monitored for the user monitored account 124. There may be some roles for which traffic is to be monitored and some roles for which traffic is not to be monitored, or different types of monitoring may be performed for different roles, among other such options.

Such an approach can provide an easy-to-use deployment tool for obtaining network visibility to obtain data useful for, for example, various network security tools. Network visibility tools can be automatically deployed and configured for any group or collection of resources, as may be associated with a single entity, so that visibility can be obtained with respect to the behavior or users, applications, or resources associated with that group when communicating or otherwise transmitting data over at least one network. Such visibility can be used for a variety of purposes, such as security, compliance, auditing, and the like. Such a tool can be deployed into any network, and can be provided as a service for any group of resources as long as the service is able to obtain at least metadata for respective network communications, at least those of a type that are to be monitored. Such a tool can also scale as the size or complexity of a group of resources changes. These tools can also be used in situations where there may be many different environments to be monitored that are isolated, or at least logically separated, such that traditional visibility tools would have difficulty obtaining the relevant information from all these disparate environments (e.g., virtual cloud accounts for different users of a resource provider). Individual tools can be automatically deployed and configured for these separate environments to allow for a same or similar type of visibility that could be obtained in a single environment.

A visibility pod can be automatically deployed and configured in response to a request from a user, or for a new deployment that satisfies one or more monitoring criteria, among other such options. In at least one embodiment, such visibility pods can be deployed as compute instances, for example, to any user account or allocation of resources in a networked resource environment. The automatic configuration can also include the deployment of one or more appropriate endpoints for receiving network communications. Once configured, connection of a network to the visibility pod enables the resource to analyze traffic and extract the relevant information (e.g., metadata). In different embodiments, visibility pods may include physical or virtual compute resources, as may support one or more applications that may relate to security, network analysis, or threat detection as discussed in more detail elsewhere herein. A visibility pod may also include a virtual router or network load balancer to assist with managing relevant network traffic. While a virtual visibility component is limited to obtaining specific types of metadata in various embodiments presented herein, it should be understood that in other embodiments visibility may be obtained into any data or metadata in, or associated with, network traffic that can be accessed by a visibility pod, at least where permitted by preference, user permission, or policy (e.g., privacy or confidentiality). A type and/or amount of visibility data collected may also vary by type of user or role, such as where corporate users may have more data collected than external customers of a resource provider. Certain types of users may not have any visibility data collected in at least some situations.

Another benefit to such a virtual visibility service or tool is that any person or entity with access or rights to the service or tool can cause that service or tool to be deployed to any applicable networked group of resources of any supported type. Tools can be deployed at different levels of a same set of networked resources as well, such as where a company may have an overall monitoring of network communications for any of their on-prem or allocated resources, but specific teams or groups of users within that company may also have a separate tool that can provide visibility into network communications for only those resources relevant to those teams or groups.

Figure 3:
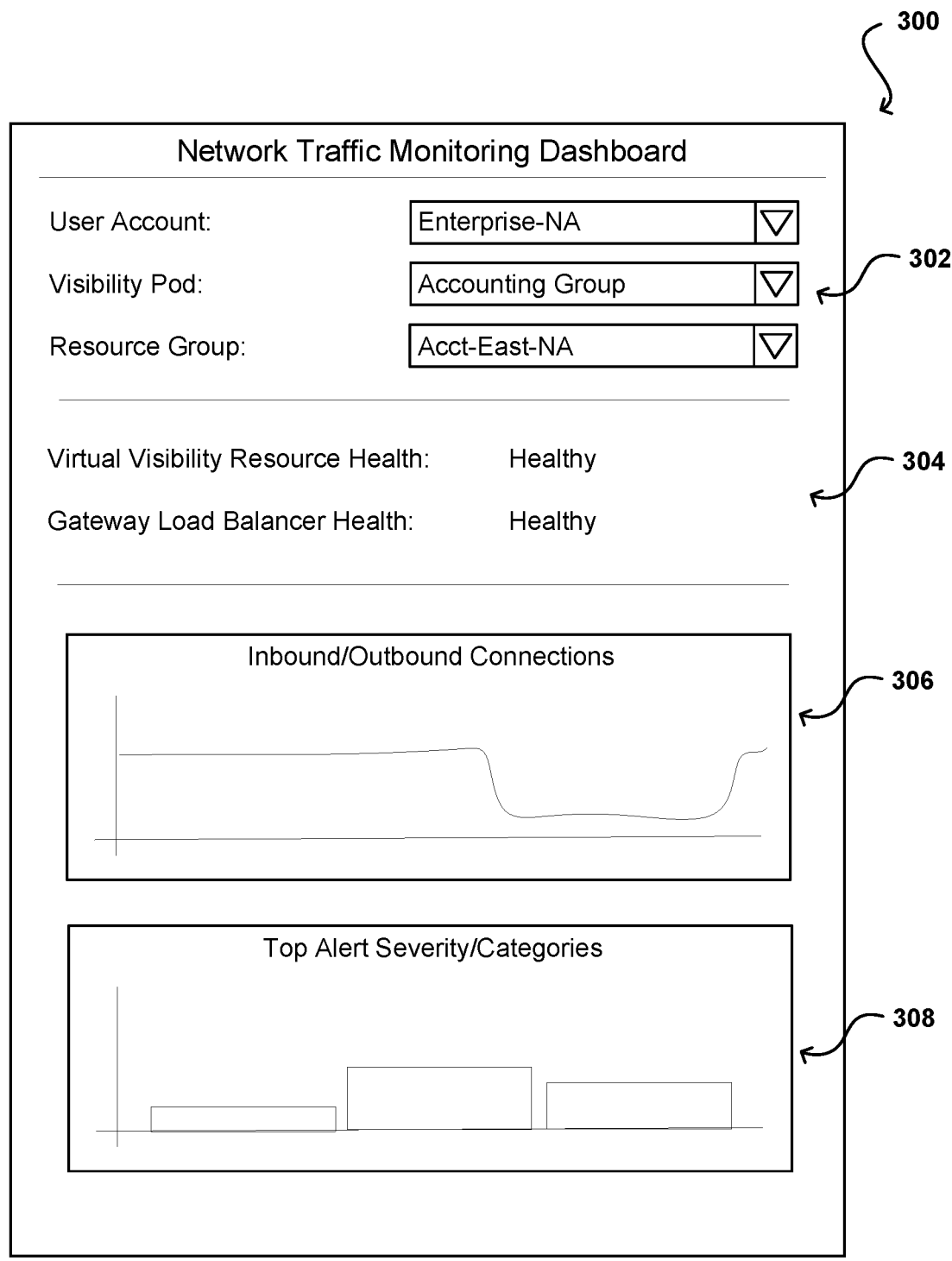
FIG. 3 illustrates an example interface for presenting monitored information that can be generated in accordance with various embodiments.

In at least one embodiment, data obtained using a visibility pod can be provided for presentation to a user using an interface or monitoring console 300, such as that illustrated in FIG. 3. In this example, a user can select from various options 302 to indicate a user account, and from that account select the visibility pod for which monitoring data is to be presented and/or a resource group associated with that visibility pod. In response to these selections, the interface may present relevant resource health or status information 304, such as a health of the visibility pod and the corresponding gateway load balancer. The interface may also present results based on analyzing various data for the resource group over a recent period of time, such as may indicate a number of network connections detected 306 over a recent period of time, or a number of alerts per category detected 308 over a recent period of time. A user may have options to drill down on any of these values to obtain additional information, such as to view relevant log files or information for specific alerts, or types of alerts. The user may be able to view other data related to the monitoring, or modify configuration or policy data to be utilized where applicable and permitted. As mentioned, at least some of this data may be generated by one or more analytical applications or tools (e.g., Zeek or Suricata) running on one or more virtual resources of the visibility pod. Such an interface, console, or dashboard may also allow a user to run reports or perform other such actions. Other interfaces may be provided to a user as well, such as a wizard interface that enables a user to specify information for allocation of a resource group as discussed elsewhere herein.

Figure 4:
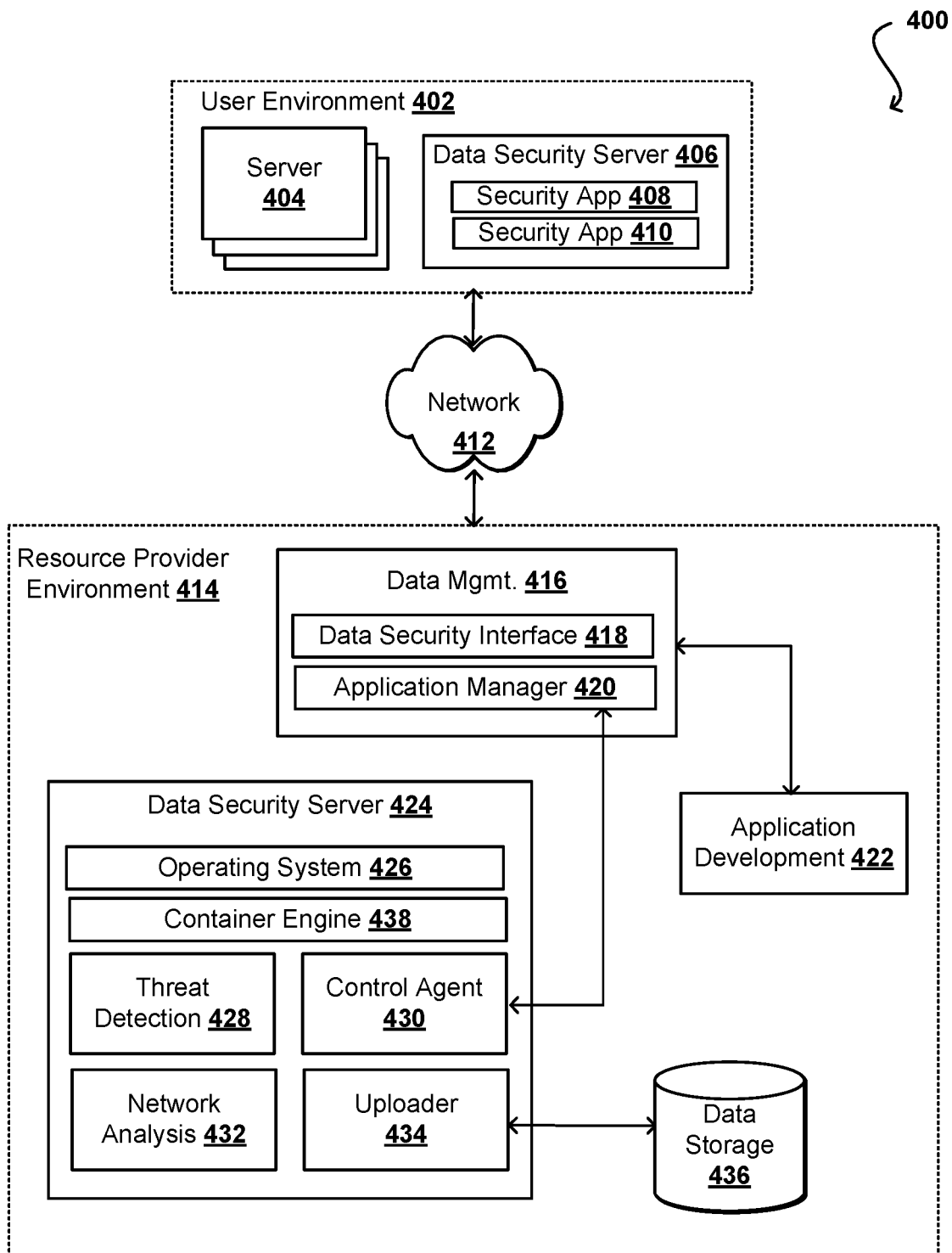
FIG. 4 illustrates an example system for obtaining visibility data that can be used in accordance with various embodiments.

FIG. 4 illustrates an example deployment 400 for a visibility management service that can be utilized in accordance with at least one embodiment. In this example, resources such as servers 404 of a user environment 402 can call into a resource provider environment 414 across at least one network 412. The user environment 402 can include a data security server 406 with one or more data security applications 408, 410. The resource provider environment 414 can also include a data management server 416 and a data security server 424. Such components, resources, systems, or services can provide secure information security in a way that can be easily deployed into any network (trusted or untrusted) and readily controlled via a compute resource service provider or other trusted service. The information security architecture may be instantiated on a device in a network that has access to, or is connected with, a device that has access to traffic flow of the network, to create a data security server 424. The data security server 424 may be created on standalone hardware, or integrated with existing network hardware, through the use of a virtualized environment, such as a software container engine or service, such as Docker. The data security server 424 may be loaded with a software container engine 426, such that it can support multiple different software containers that may share a host operating system 426, libraries, etc., but allow isolated execution of one or more applications in the separate software containers. Various security and monitoring applications may be installed in separate containers on the data security server 424, such as may provide various threat detection tools 428 and network analysis tools 432. The security data server 424 may also include a control agent 430, which enables a remote device, such as a data management service 416, to control operations performed by the one or more security and monitoring applications, and enables efficient updating and version control for those applications and the operations system of the data security server 424. The one or more security and monitoring applications may obtain copies of traffic (e.g., packets) of the network and perform various processes on that data to generate security data. The data security server 424 may send the security data to the data management service 416 and/or a data storage service 436, where the data may be stored in a specified account, managed, and made accessible with proper credentials through a centralized data security interface 418.

In at least one embodiment, multiple data security servers may be created for a given network, and organized into a logical site. Each data security server may, in some cases, be on separate hardware, or may be virtualized on the same hardware. Each data security server may be isolated from other data security servers and other network computing resources, and may execute the same or different security and monitoring applications, such that each data security server is individually configurable. Each data security server may individually report security data back to a data management service, which can store the data in an account associated with the specific data security server.

In some cases, the data security server 424 may be virtualized and run on commodity hardware, thus expanding the application of the described system and drastically reducing the time necessary to get a data security server up and running. Various security applications may be loaded onto the data security server 424, including various threat detection applications 428, network analysis applications 432, and others that may provide customizable deep packet inspection and various signature matching functionality. In some cases, the framework of the data security server 424 may be utilized to execute a variety of other applications in any network, such as for remote computing, remote networks, etc.

In one example, a data security server 424, or server instance, can be created by loading a supported operating system 426 (e.g., Linux) and a software container engine 438 onto a computing device connected to a network to be analyzed. The data security server 424 may be logically associated with a site, such as may correspond to user environment 402. A security code may be sent from a data management service 416, via a separate communication channel, such as via email, to an administrator device used to create the site. The administrator may enter the security code into an interface provided by the site, which may communicate the security code to the data management service 416. Upon validating the security code, the data management service 416 may send a number of commands to the site to install one or more security monitoring applications 408, 410, such as threat detection and network analysis applications. In addition, the data management service 424 may send a number of commands to the site to install a control agent, which gives the data management service 424 access to control operations performed within the site, update the applications, etc., and a data storage service upload application, to facilitate reporting the security data back to a data storage service. Upon executing the commands, the site may obtain copies of traffic (e.g., packets) from the network 412, for example via a communication port of an internet gateway of the network (e.g., an Ethernet port). The site, via the one or more security applications 408, 410, may analyze the obtained traffic and generate security data indicating various attributes of the traffic. The site may upload the security data to a data storage service 436, to be made accessible to an administrator of the site. In some instances, the data management service 416 may host the data storage service 436. In other examples the two services may be separate. In some aspects, by connecting directly to the Internet gateway or other similar computing device of a network, and not an endpoint, such as one or more user devices (smart phones, tablets, etc.), data security concerns of obtaining copies of network traffic and generated analyzes of that data may be greatly reduced.

In at least one embodiment, the site may be divided into multiple separate software container engines or isolated computing resources or environments, to enable isolated analysis of traffic of different parts of a network. In these cases, multiple data security servers may be instantiated, on the same or different physical or virtual machines of the network, and each may be separately configurable to install and execute different security monitoring applications, and generate different sets of security data.

In at least one embodiment, the data security server 424 may execute a number of security monitoring applications to obtain and analyze copies of traffic flowing into and out of the network 412, to provide information security and analytic functionality through a compute resource service provider environment 414. The data security server 424 may be connected to a communication port, such as a SPAN, Ethernet, or optical port, of a communication device of the network 412, such as an internet gateway or similar functioning device or virtualized machine. In some aspects, the data security server 414 may include a virtualized computing resource, such as a virtualized instance or software container engine, loaded onto an existing network computing resource, such as device or server, as will be described in greater detail below. In these cases, the data security server 424 may be configured to run an operating system 426 that supports software containers and software container engines, such as Linux. The data security server 406 may, alternatively be a standalone computing device, loaded onto specific hardware, that may be connected to a computing device. Examples of computing devices on which the data security server 406 may reside include physical computing systems (e.g., servers, desktop computers, laptop computers, thin clients, etc.) and/or services (e.g., via application programming interface calls, web service calls, or other programmatic methods), databases (which may be implemented on one or more of the foregoing examples), and the like. The data security server 406 may obtain copies of traffic of a network 412, analyze the traffic via the one or more applications 408, 410, and transmit the analyzed data and/or results to a compute resource service provider environment 414 via a network 412, such as the Internet. In some cases, the data security server 406 may include a control agent that enables a compute resource service provider environment 414 to control operations performed by the data security server 406 and/or specific applications 408, 410. In some cases, the control agent may also perform/enable efficient updating and version control of one or more of applications and the operating system of the data security server. The data security server may be isolated from various network devices to ensure that the data obtained and results of analyses performed on the data are secure from these and other network devices. In some cases, the data security server may be configured to execute other applications, such as applications related or not related to data security, provided by the compute resource service provider and/or outside developers.

The site or user environment 402 may comprise a logical organization of one or more data security servers 406 associated with a network 412. In some aspects, the site may be associated with one or more of computing devices of the network. In some cases, the site may be associated with an identifier in a record stored in the data security server, the computing resource service provider environment, the data management service, the data storage service, or another computing device or storage location, or a combination thereof. In some aspects, the identity and IP address and/or other characterizes of the data security server and/or computing devices may be associated with a site identifier in a table maintained in memory of at least one of the data security server, the computing resource service provider environment, the data management service, the data storage service, or another computing device. In some aspects, site may correspond to a physical location, such as a building or campus of an organization associated with a network.

A data security server 424 may include an OS 426, such as Linux, that supports a software container engine 438, such as the Docker Engine or Docker Enterprise Container platform, offered by Docker, Inc., utilizing Container 1.2, or variants thereof, or similar services or products provided by other companies. The software container engine 438 may provide for isolated containers in which one or more of various applications may execute. In some examples a data security server 424 may be a virtualized computing instance or container instance operating on hardware connected to a network to be analyzed. In other cases, data security server may run on distinct hardware, installed into a network.

In one embodiment, various components of a data security server execute in a software container engine 438 or a software container service. In at least one embodiment, a "software container" (also referred to as a "container" for brevity) may be an isolated user space instance. One or more of threat detection application 428, network analysis application 432, control agent 430, and/or uploader 434 may be executed in one or more software containers (each in its own container or some combined into one container). That is, in some embodiments a software container is a lightweight, virtualized instance running under a computer system instance, such as a container engine 438, which includes programs, data, and system libraries. Therefore, in some embodiments, a software container engine 438 may simply abstract an operating system kernel, in contrast to a virtual machine which abstracts an entire hardware device. Furthermore, in some embodiments, although software containers run in isolation from each other, the software containers may share the same binaries and library files as needed.

When a software container is run, the running program or process may be isolated from other processes running in the same computer system instance. Thus, multiple software containers may each run under an operating system 426 (e.g., using memory, CPU, and storage allocated by the operating system) of a container instance and execute in isolation from each other (e.g., each container may have an isolated view of the file system of the operating system). Each of the containers may have its own process namespace, and applications running within the containers may be isolated by only having access to resources available to the container process namespace. The process namespace may be associated with process identifiers (PID) associated with running processes. Thus a PID namespace may provide isolation for the PID-allocated processes running in the namespace. Another type of namespace referred to in the present disclosure is a network namespace. In some embodiments, a network namespace isolates physical or virtual network interface controllers, firewall rules, routing tables, and so on. In some implementations, network namespaces may be communicatively coupled to each other using a virtual Ethernet device.

A system that manages software containers may be referred to herein as a software container engine 438. A software container service may include a software container engine that executes as a service. It is contemplated that a standalone software container engine (e.g., the Docker container engine, the CoreOS Rocket container engine, provided by CoreOS, etc) can be configured to perform the techniques described herein. Software containers may be launched to have only specified resources from resources allocated to the container instance under which the software container is running; that is, a task definition may specify that a software container only utilize a specified amount of memory and/or a specified amount of processing power. In some examples, a "task definition" refers to parameters specifying a set of containers (i.e., a set of containers that, when running on a host computing system, are associated with each other) that are to start as a group, for example defined by the data management service. The task definition may be written in any suitable format, such as Python. In other examples, the task definition may be written in another format, such as JavaScript Object Notation (JSON), Extensible Markup Language (XML), etc. The task definition may further specify disk and network locations that the software containers are able to share on a single physical machine.

Thus, the task definition may be utilized for launching the set of software containers. A task definition file may specify multiple tasks for respective software containers. In some examples, a "task" refers to a process specified in the task definition to be performed by a software container. In some aspects, a site, or logical grouping of software containers, may be at least partially defined by a task definition file.

As illustrated, a data security server 424 may include a threat detection application, engine, or process 428. A threat detection application may obtain packets entering and exiting the network to be analyzed, for example via one or more connections with an Internet gateway of the network, such as via an Ethernet port, SPAN port, or optical port. The threat detection application may perform real time or near real time intrusion detection, inline intrusion prevention, and other network security monitoring functions, for example based on one or a number of rule sets. In some aspects, the threat detection application may include a signature library that may detect certain threats based on known, anticipated, or configurable signatures found in network traffic. The threat detection applications may support a variety of input and output formats, such as YAML and JSON, and in some aspects, may be open source. In some examples, the threat detection application may include some or all of the functionality of a Suricata engine.

A data security server may also include a network analysis application 432. The network analysis application 432 may obtain packets entering and exiting the network to be analyzed, for example via one or more connections with an Internet gateway of the network. The network analysis application 432 may perform deep packet inspection, generate logs of network activity, perform semantic analysis on packets, and so on. Examples of software that may be utilized by such a network analysis application 432 include packet analyzers (e.g., Fiddler) or network monitoring framework (Bro Network Security Monitor, Zeek, or components thereof). Additionally, the network analysis application 432 may include or communicate with hardware components such as network monitoring interface cards (NMICs). A network analysis application 432, upon detecting communications (e.g., a packet or message) from a network server to an outside device or vice versa, may parse the communications and obtain network traffic information related to the communications and provide the network traffic information to a session queue to be recorded. Network traffic information may refer to structured data related to the communications, the sender IP and port, destination IP and port, message, and information indicating a temporal sequence that allows other components to determine the relative ordering of one communication of a session with another communication of a session. Network traffic information includes at least data from a communication that is usable to: define a temporal ordering of the communication relative to other communications in a session; and determine a session state. As an example, network traffic information may comprise a timestamp, sequence number, or other temporal value indicating when the network monitor processes a communication and a TLS handshake message type, where the timing may be a based on a clock measurement (e.g., a timestamp) or relative to other communications (e.g., a sequence number).

Each of a threat detection application 428 and a network analysis application 432 may generate results of analyses performed by the respective applications. The applications may send those results, herein collectively referred to as security data, to a data uploader 434 to be sent to a data storage service 436. In some embodiments, one or more alerts or notifications may be generated, either by one or more processes of the data security server 424, the data management service 416, and/or the data storage service 436, to notify relevant parties of potential security risks or breaches. In some aspects, the data management service 416 may include a data security interface 418 that may provide any number of different and configurable interfaces (e.g., web interfaces, graphical user interfaces, etc.) for system administrators to interact and received notifications from the data security server 424.

In some aspects, a data security server may also include other containers executing other applications or processes not illustrated, including providing any of a number of other related security analysis and data security monitoring functionality. It should be appreciated that the various configurations of applications may be organized into and/or share software containers based on resources available, security needs, and resources needed to perform certain analyses, and so on.

A data security server can also include a control agent 430, which interfaces with data management service 416 and enables the data management service to control operations performed by data security server and associated applications. In some aspects, the control agent may be provisioned with the OS 426 and/or container engine 438, and/or activated via submission of a security code or other credentials to the data management service 416. In some aspects, the control agent 430 may update one or more applications, the operating system, or other aspects of a data security server 424, and/or may control other functions performed by components of the data security server. In some cases, the containerized environment of a data security server may enable rolling out updates and layer solutions to the various sub-systems of data security server and layer solutions. For example, a standard version of an application may be installed into a first container. One or more updates may be installed in a new container, and network specific plugins installed into another.

A data security server can also include a data uploader 434 to obtain data generated by one or more of a threat detection application 428 and a network analysis application 432, and/or other applications not illustrated, and/or copies of packets obtained from the network, and transmit that data to a data storage service 436. The data storage service 436 may store the received data in an account record associated with the data security server 424. In some aspects, the data security server 424 may receive credentials, for example, from an admin or user device, to link an account of the data storage service 436 with the data security server 424. The data security server 424 may send the credentials to the data storage service 436, and upon validation, may send the security data to the data storage service 436 for storage and access associated with the account.

In some aspects, the data security server may upload all or most obtained traffic data and generated security data to a data storage service 436, without persistently or permanently storing that data on the server itself. In some cases, the obtained traffic data and generated security data may be stored in a temporary file system of the OS, and cleared or erased on powering down of the security server Upon restarting the data security server, the control agent 430 can attempt to authenticate with the data management service 416. If authentication fails, the data security server may be wiped clean via the control agent 430, such that the applications may be erased, thus protecting security of data and applications of the data security server.

In some aspects, the security of data obtained and analyzed by a data security server may be increased by only maintaining images in read-only format (e.g., check summed), by limiting or restricting root access to the OS, and not allowing a secure shell (SSH) to be installed on the server. In some aspects, the only aspects or components of the data security server that interface to a network may be the control agent, and the uploader, which may be run in containers, thus isolating from the rest of data security server.

In some examples, a data management service may include an application manager 420, which may be a process executed by a data management service 416 to send updates to the one or more applications. In some aspects, the application manager 420 may receive application updates and/or new applications from an application development process or system 422. In some aspects the application development system 422 may be a computing device, a distributed computing system, and/or may include a network of various devices enabling multiple different actors to update and develop new applications for a data security server. The application manager 420 may periodically, or upon receiving updates from the application development system 422, send the updated instructions or commend sets to the control agent 430*m*, which may facilitate updating or installing new applications within the data security server.

In some aspects, the application manager 420 may also be responsible for provisioning a new data security server in the first instance. In this case, the application manager 420 may facilitate a computing device to install or verify installation of a supported OS and a software container engine to transform a computing device into data security server. In some cases, the initial provisioning may include installing a control agent into a container on the computing device. In other cases, a control agent may be installed at a later time. The application manager 420 may also send a set of commands for the data security server to install the threat detection application, the network analysis application, the uploader, and in some cases the control agent.

In some cases, an OS and container engine may be installed on a computing device in network, such as an untrusted network, to perform other functions, outside of data security functions. In this case, the isolation of the different containers operating under the container engine may enable placing any software into an untrusted network, while ensuring data used by the application is secure from the remainder of the network.

The described structure of a data security server and the security service more generally may enable much faster installing of the system into new and/or untrusted networks and subsequent updating. This structure may also enable replacement servers, such in the case of a failure, to be instantiated very quickly. Each container engine may be defined by an image, such that upon a failure event, the last saved version of the image may be loaded onto a new container engine, and a replacement server instantiated. Also it should be appreciated that the OS, container engine, and various containers or applications may be run on variety of hardware, which is non-specialized or commodity, thus allowing provisioning of new servers into various networks including a variety of different computing devices. These attributes of the described system also ensure scalable deployment, by reducing barriers to installing new servers into various locations and reducing the time necessary to do so.

In some embodiments, there may be multiple data security servers associated with different user sites, in communication with a single data management service. Different sites may be created, and different data security servers associated with each site. In this way, different data security functions may be configured for specific networks and specific network locations, resources, etc., with different data security servers positioned at different locations within, and/or connected to different resources in different network.

A given site may be a logical organization of one or more data security servers associated with a network. In some aspects, a site may be associated with one or more computing devices of a network. In some cases, a site may be associated with an identifier in a record stored in data security servers, the data management service, and/or the data storage service, or another computing device or storage location, or a combination thereof. In some aspects, a site may include a number of devices across a network, determined by locations, such as a building, campus, etc. In other cases, a site may include computing devices performing certain operations or functionality, such as security, data storage, and so on.

In some examples, each data security server may perform specific security functions with respect to certain computing devices. For example, different data security servers may monitor specific types of traffic, look for certain types of threats or attacks, or be associated with specific subsystems of a network or computing device. In other examples, a data security server may be redundant, in the case of a system critical computing device or function, such as in the case of data security servers both being connected to a computing device.

In some aspects, a single account may be associated with multiple sites. The different sites may be collocated or physically separated, such as in different buildings, or at different campuses. In this way, sites and data security servers may be configured to provide a vast array of different data security and monitoring functions throughout one or multiple networks.

Figure 5:
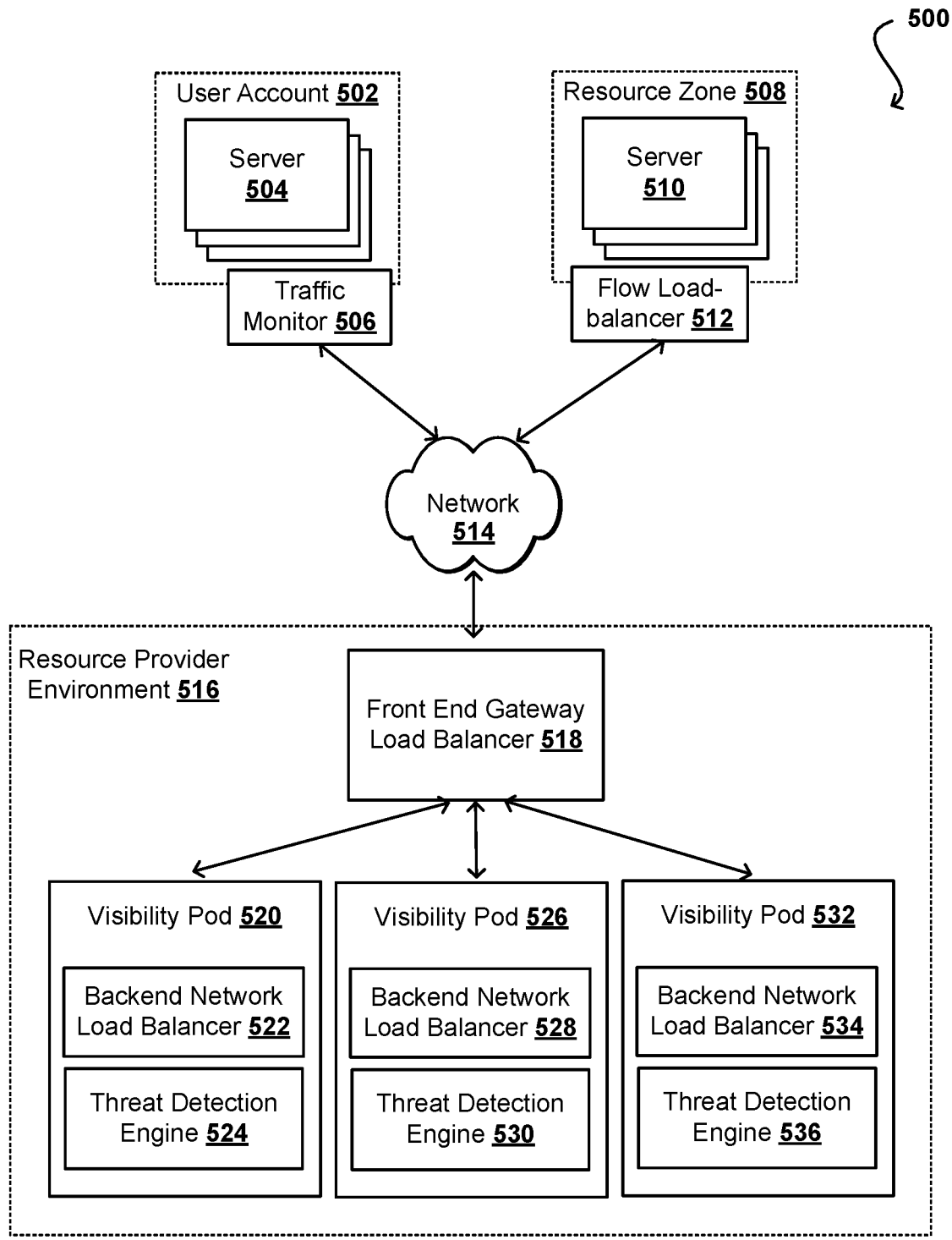
FIG. 5 illustrates an example set of virtual visibility pods deployed in a single environment, in accordance with various embodiments.

FIG. 5 illustrates an example network configuration 500 in which multiple visibility pods can be associated with and/or accessed by one or more servers 504, or other such resources, in a user account. As for other user accounts referenced herein, such an account may be associated with entities or parties and are not limited to a single user, but may be accessed by one or more users associated with a given entity or party, and the account itself refers to resources (e.g., physical or virtual hardware and software) that may be associated with, allocated to, or accessible under an account for such a user, entity, or party. In some embodiments, resources allocated to a user account may be divided into multiple separate software container engines or isolated computing resources or environments, to enable isolated analysis of traffic of different parts of a network.

In this example, communications over a network 514 may occur between a user account 502 and at least one other resource zone 508, as may include a number of servers 510 or other such resources, as may be managed by at least one flow load balancer 512. A traffic monitor 506 of the monitored user account 502 may extract relevant metadata from communications over the network 514, and may direct that metadata to a front end gateway load balancer 518 of a resource provider environment. The metadata can be directed to an appropriate visibility pods 520, 526, 532, which can direct the metadata via a backend network load balancer 522, 528, 534 to an appropriate threat detection engine 524, 530, 536, network analysis application, or other such metadata analyzer. In at least one embodiment, the respective engine or application can at least log the metadata, or information generated from the metadata, to a log or storage service for subsequent analysis. In some instances, the engine or application may also (or alternatively) generate an alert if a threat or other potential issue is detected that qualifies one or more alert criteria, such as an active security threat that can be mitigated. In some embodiments, results of analysis by these various engines can be combined together to generate a single, overall determination as to the potential threat or issue as discussed elsewhere herein.

Figure 6:
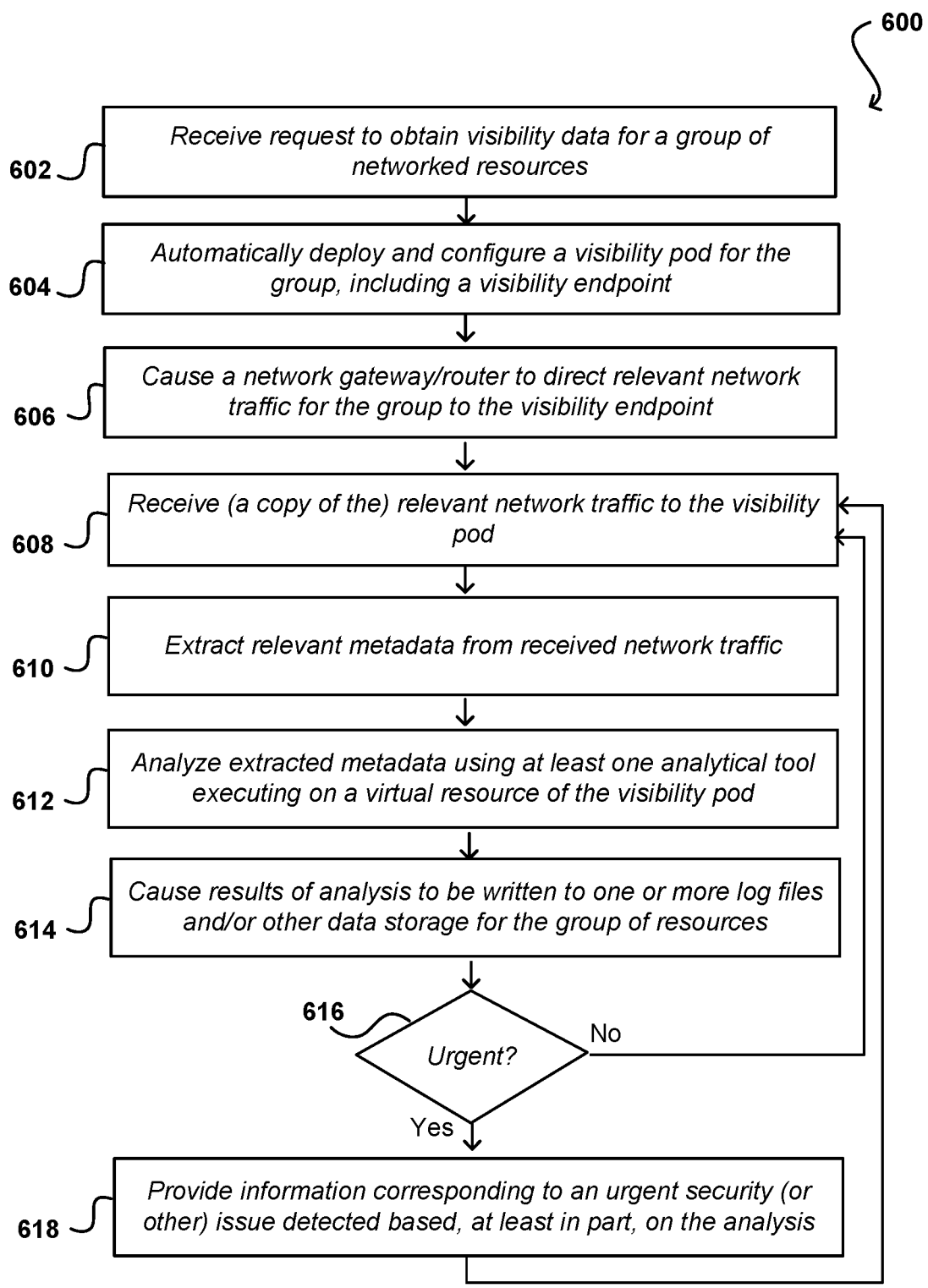
FIG. 6 illustrates an example process for automatically deploying and configuring a visibility pod that can be performed in accordance with various embodiments.

FIG. 6 illustrates an example process 600 for automatically deploying a visibility pod that can be performed in accordance with various embodiments. It should be understood that for this and other processes presented herein there may be additional, fewer, or alternative steps performed in similar or alternative orders, or at least partially in parallel, within the scope of the various embodiments unless otherwise specifically stated. In this example, a request is received 602 to obtain visibility data for a group of networked resources, as may be associated with a user account with a resource provider. This request may be received to an interface, such as an API, or may be entered through a resource management console, among other such options. In some embodiments, the request may be generated automatically in response to creation or allocation of the group of networked resources. In still other embodiments, the request may be received as a result of one or more answers provided in a resource allocation wizard used to allocate the group of resources. Once received, a visibility pod can be automatically deployed 604 and configured for the group of networked resources, as may include at least one virtual compute instance to run at least one visibility-related application, as well as a visibility endpoint that is able to receive network traffic. The configuration can involve any relevant infrastructure, as well as a location or device to which the visibility data should be stored. Once configured, a network gateway or router (e.g., a gateway load balancer) can be caused 606 to connect the relevant group of resources (e.g., a monitored user account) to the visibility pod such that relevant network traffic for the group is directed to the visibility endpoint.

Once configured and connected, a copy of the relevant network traffic can be received 608 to the visibility pod. This can be received as part of a network mirroring session in some embodiments. This can include any network traffic sent from, or received to, the group of network resources being monitored by this particular visibility pod, which may be one of many such resources deployed for different groupings of a set of resources in one or more resource environments. The network traffic is not limited to a specific network unless so indicated, and may include traffic sent out to the Internet or across a cellular network, between two networked devices inside a secure environment, or any other traffic sent between a monitored source and/or monitored destination. The traffic can be uploaded through a network connect resource and then a gateway load balancer, or through a traffic mirroring session into a gateway load balancer, for example, that can cause the traffic to be directed to the appropriate endpoint of the visibility pod. Once received, a virtual compute instance of the visibility pod can extract 610 the relevant metadata from the network traffic, where that relevant metadata may include information such as source or destination address, type of communication, and others discussed or suggested elsewhere herein, or that would otherwise be apparent in light of the present disclosure. The extracted metadata can then be analyzed 612 using at least one network analysis tool or application executing on at least one virtual resource of the visibility pod. In at least one embodiment, may include a threat detection or network analysis tool, among other such options. Results of this analysis, as may include security-related information, can then be caused 614 to be written to one or more log files and/or data storage for this group or resources. In some embodiments, a local agent will obtain this information from the log files and write that information to the relevant data storage so as to be available to the relevant user, application, or entity, such as through a management console. As mentioned elsewhere herein, relevant metadata can be split among different visibility pods, and/or different compute instances within a single visibility pod, with the results being combined, aggregated, or stitched back together to provide an overall view of the analyzed behavior. If it is determined 616 that a potentially urgent issue has been identified, such as one that relates to a significant security issue, then information for that urgent issue can be provided 618, such as by writing to a log, that can then be used to generate an alert corresponding to that urgent issue. Such an alert can enable a person such as a security engineer to or network administrator to quickly determine if one or more actions should be taken for the security issue. Otherwise, the information in the log data may be used at a later time to investigate a detected issue or audit operation of the networked resources for policy compliance, among other such options.

The monitored information can be used for purposes other than security as discussed elsewhere herein. This can include, for example determining the health of a visibility pod. The health can include the availability and proper functioning of such a resource, as may be determined by the consistency of data written to a log file for a monitored group of networked resources. Other aspects of the resource can be monitored as well, such as to ensure there is sufficient memory or disk space for continued successful operation. Health of the load balancer can also be monitored. The health criteria can change automatically as the size or complexity of the monitored group of resources changes or scales.

Figure 7:
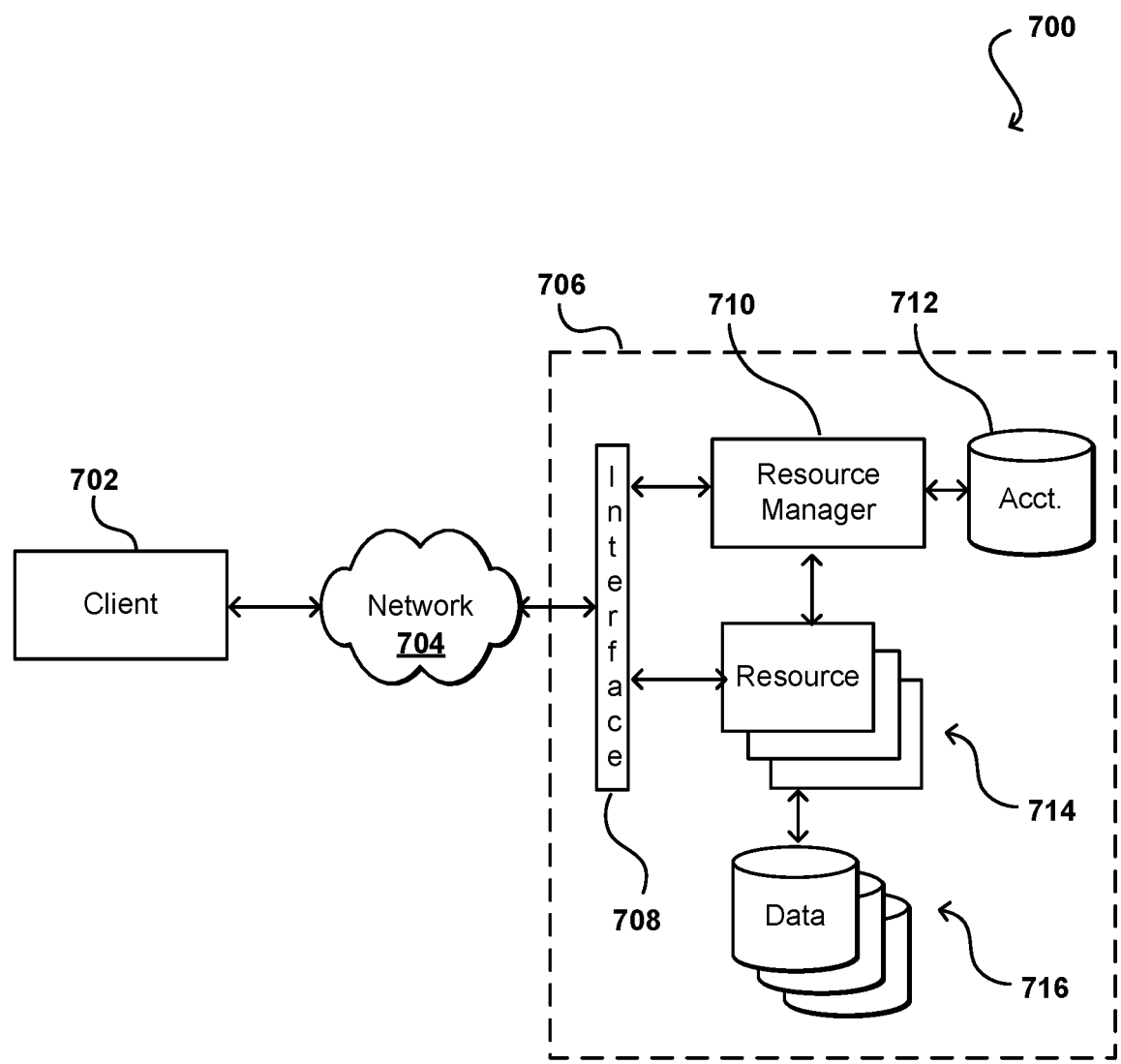
FIG. 7 illustrates an example network-inclusive computing environment in which aspects of various embodiments can be implemented.

FIG. 7 illustrates an example environment 700 in which aspect of various embodiments can be implemented. Such an environment can be used in some embodiments to provide resource capacity for one or more users, or customers of a resource provider, as part of a shared or multi-tenant resource environment. In this example a user is able to utilize a client device 702 to submit requests across at least one network 704 to a multi-tenant resource provider environment 706. This can include an end client that is able to use a certificate for secure communications, where the certificate was obtained using a requestor executing on the end client. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 706 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 714 of one or more types. These types can include, for example, application servers operable to process instructions provided by a user or database servers operable to process data stored in one or more data stores 716 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identity, specific address, or other such information that can enable the client device 702 to communicate with an allocated resource without having to communicate with the resource manager 710, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 8:
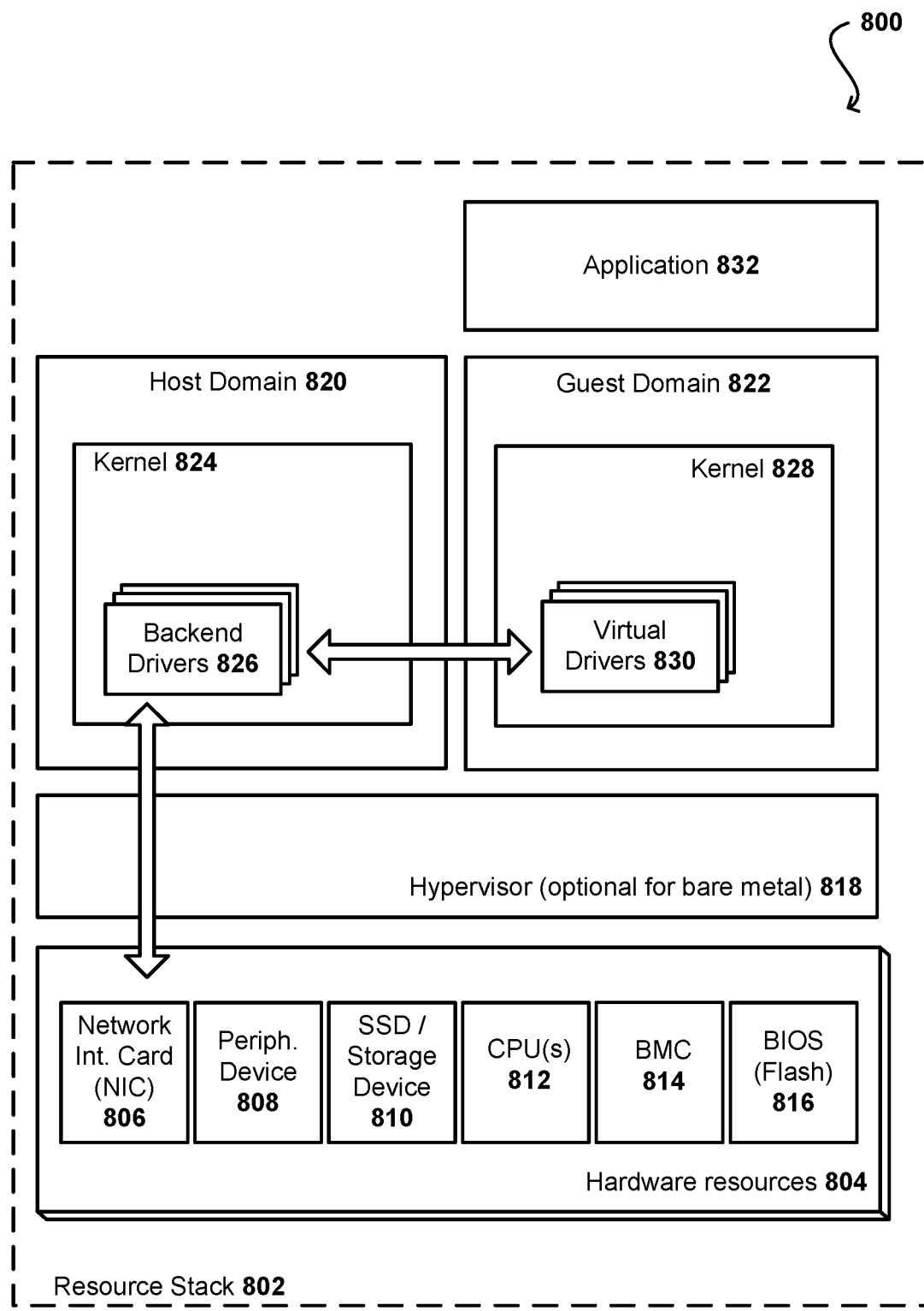
FIG. 8 illustrates example components of a server that can be utilized to perform at least a portion of a transcoding process, in accordance with various embodiments.

FIG. 8 illustrates an example resource stack 802 of a physical resource 800 that can be utilized in accordance with various embodiments. Such a resource stack 802 can be used to provide an allocated environment for a user (or customer of a resource provider) having an operating system provisioned on the resource. In accordance with the illustrated embodiment, the resource stack 802 includes a number of hardware resources 804, such as one or more central processing units (CPUs) 812; solid state drives (SSDs) or other storage devices 810; a network interface card (NIC) 806, one or more peripheral devices (e.g., a graphics processing unit (GPU), etc.) 808, a BIOS implemented in flash memory 816, and a baseboard management controller (BMC) 814, and the like. In some embodiments, the hardware resources 804 reside on a single computing device (e.g. chassis). In other embodiments, the hardware resources can reside on multiple devices, racks, chassis, and the like. Running on top of the hardware resources 804, a virtual resource stack may include a virtualization layer such as a hypervisor 818 for a Xen-based implementation, a host domain 820, and potentially also one or more guest domains 822 capable of executing at least one application 832. The hypervisor 818, if utilized for a virtualized environment, can manage execution of the one or more guest operating systems and allow multiple instances of different operating systems to share the underlying hardware resources 804. Conventionally, hypervisors are installed on server hardware, with the function of running guest operating systems, where the guest operating systems themselves act as servers.

In accordance with an embodiment, a hypervisor 818 can host a number of domains (e.g., virtual machines), such as the host domain 820 and one or more guest domains 822. In one embodiment, the host domain 820 (e.g., the Dom-0) is the first domain created and helps virtualize hardware resources and manage all of the other domains running on the hypervisor 818. For example, the host domain 820 can manage the creating, destroying, migrating, saving, or restoring the one or more guest domains 822 (e.g., the Dom-U). In accordance with various embodiments, the hypervisor 818 can control access to the hardware resources such as the CPU, input/output (I/O) memory, and hypervisor memory.

A guest domain 822 can include one or more virtualized or para-virtualized drivers 830 and the host domain can include one or more backend device drivers 826. When the operating system (OS) kernel 828 in the guest domain 822 wants to invoke an I/O operation, the virtualized driver 830 may perform the operation by way of communicating with the backend device driver 826 in the host domain 820. When the guest driver 830 wants to initiate an I/O operation (e.g., to send out a network packet), a guest kernel component can identify which physical memory buffer contains the packet (or other data) and the guest driver 830 can either copy the memory buffer to a temporary storage location in the kernel for performing I/O or obtain a set of pointers to the memory pages that contain the packet(s). In at least one embodiment, these locations or pointers are provided to the backend driver 826 of the host kernel 824 which can obtain access to the data and communicate it directly to the hardware device, such as the NIC 806 for sending the packet over the network.

It should be noted that the resource stack 802 illustrated in FIG. 8 is only one possible example of a set of resources that is capable of providing a virtualized computing environment and that the various embodiments described herein are not necessarily limited to this particular resource stack. In some embodiments, the guest domain 822 may have substantially native or "bare metal" access to the NIC 806 hardware, for example as provided by device assignment technology based on an IO Memory Management Unit (IO-MMU) device mapping solution like Intel VT-D. In such an implementation, there may be no virtualization layer (e.g., Hypervisor) present. The host domain, or OS, may then be provided by the user, with no guest domains utilized. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 814 can maintain a list of events that have occurred in the system, referred to herein as a system event log (SEL). In at least one embodiment, the BMC 814 can receive system event logs from the BIOS 816 on the host processor. The BIOS 816 can provide data for system events over an appropriate interface, such as an I$^2$C interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 818 can prevent the guest operating system, or guest domain 822, from sending such system event log data to the BMC 814. In the case of bare metal access without such a hypervisor, however, user instances can have the ability to send data for system event that spoof events from the BIOS 816. Such activity could lead to compromised bare metal instances being prematurely degraded due to fake system event data produced by the user OS.

In at least one embodiment, however, there will be portions of the physical resource 800 that will be inaccessible to the user OS. This can include, for example, at least a portion of BIOS memory 816. BIOS memory 816 in at least one embodiment is volatile memory such that any data stored to that memory will be lost in the event of a reboot or power down event. The BIOS may keep at least a portion of host memory unmapped, such that it is not discoverable by a host OS. As mentioned, data such as a secret token can be stored to BIOS memory 816 at boot time, before a user OS is executing on the resource. Once the user OS is executing on the resource, that OS will be prevented from accessing that secret token in BIOS memory 816. In at least one embodiment, this secret token (or other stored secret) can be provided to the BMC 814 when adding system event log events, whereby the BMC 814 can confirm that the event is being sent by the BIOS 816 and not by the user OS.

Figure 9:
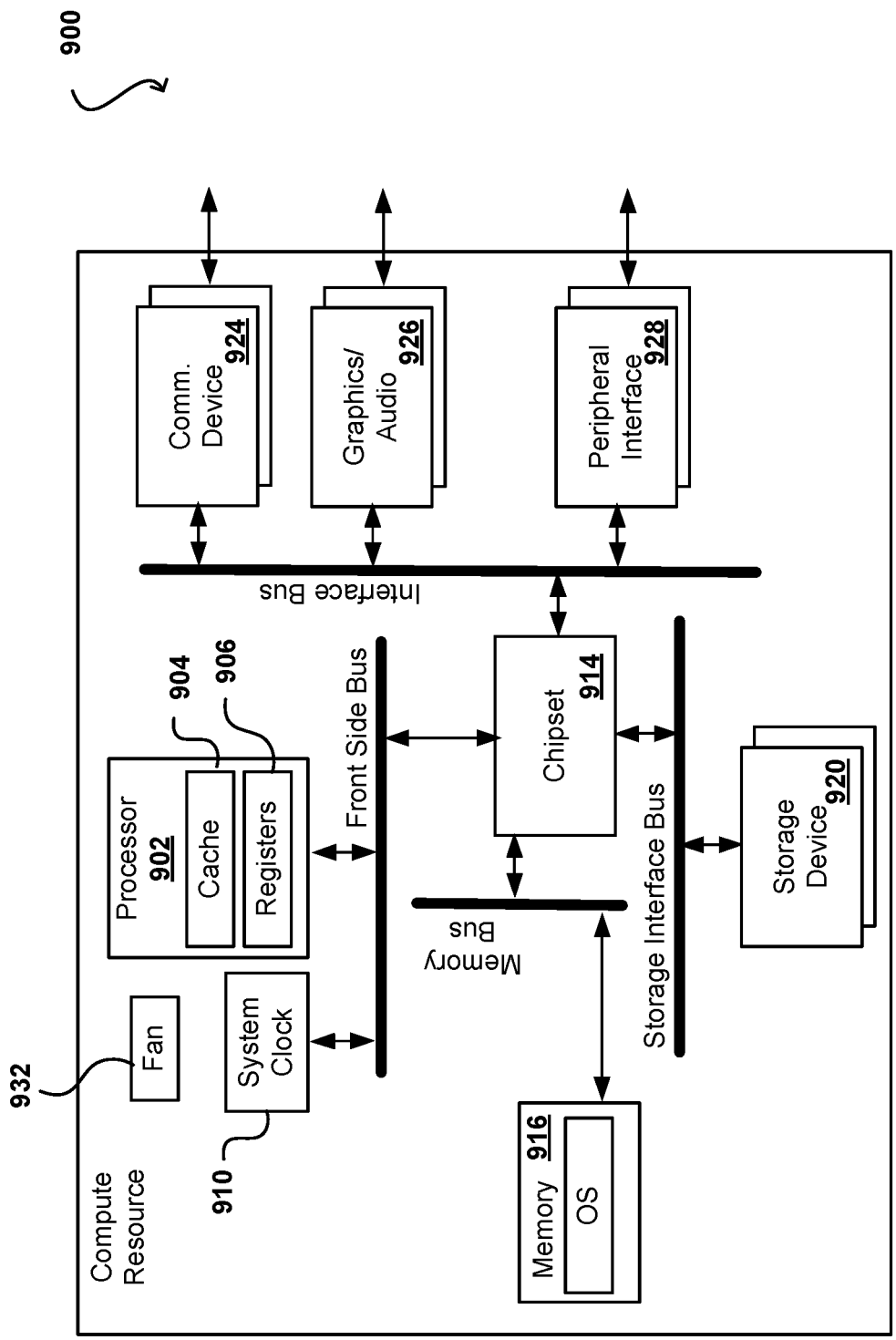
FIG. 9 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 9 illustrates components of an example computing resource 900 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 900 (e.g., a desktop or network server) will have one or more processors 902, such as central processing units (CPUs), graphics processing units (GPUs), and the like, that are electronically and/or communicatively coupled with various components using various buses, traces, and other such mechanisms. A processor 902 can include memory registers 906 and cache memory 904 for holding instructions, data, and the like. In this example, a chipset 914, which can include a northbridge and southbridge in some embodiments, can work with the various system buses to connect the processor 902 to components such as system memory 916, in the form or physical RAM or ROM, which can include the code for the operating system as well as various other instructions and data utilized for operation of the computing device. The computing device can also contain, or communicate with, one or more storage devices 920, such as hard drives, flash drives, optical storage, and the like, for persisting data and instructions similar, or in addition to, those stored in the processor and memory. The processor 902 can also communicate with various other components via the chipset 914 and an interface bus (or graphics bus, etc.), where those components can include communications devices 924 such as cellular modems or network cards, media components 926, such as graphics cards and audio components, and peripheral interfaces 928 for connecting peripheral devices, such as printers, keyboards, and the like. At least one cooling fan 932 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 902 can obtain data from physical memory 916, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 904 in at least some embodiments. The computing device 900 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 928, a communication device 924, a graphics or audio card 926, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 902 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C #or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    allocating a group of networked computing resources, in a shared resource environment, on behalf of a user;
    receiving, from the user, a request to monitor network traffic for the group of networked computing resources;
    in response to the request, allocating and automatically configuring a visibility pod for the group of networked computing resources, the visibility pod including at least one virtual resource to execute an analytical application to analyze metadata of a copy of the network traffic, the visibility pod including a visibility endpoint;
    causing a gateway load balancer to direct the copy of the network traffic for the group of networked computing resources to the visibility pod through the visibility endpoint;
    extracting the metadata from the copy of the network traffic;
    analyzing, using the analytical application executed by the at least one virtual resource of the visibility pod, the extracted metadata of the copy of the network traffic from the visibility endpoint to determine one or more behaviors of the monitored network traffic for the group of networked computing resources allocated on behalf of the user; and
    causing information, relating to the one or more behaviors, to be available to the user.

2. The computer-implemented method of claim 1, further comprising:
    storing information relating to the one or more behaviors to one or more log files or data repositories for subsequent analysis by a provider of the shared resource environment.

3. The computer-implemented method of claim 1, further comprising:
    detecting, based at least in part upon the one or more behaviors, an active security threat relating to the group of networked computing resources; and
    providing information corresponding to the active security threat, wherein an alert is able to be generated based, at least in part, upon the provided information.

4. The computer-implemented method of claim 1, wherein the metadata for the network traffic that is used for the analyzing includes at least one of sender address, sender port, destination address, destination port, communication protocol, communication type, or temporal sequence identifier.

5. The computer-implemented method of claim 1, further comprising:

causing the visibility pod to automatically receive and analyze additional network traffic for one or more additional resources added to the group of networked computing resources.

6. A computer-implemented method, comprising:
identifying a group of networked computing resources to be monitored;
automatically allocating, in response to the identification, a visibility pod for the group of networked computing resources, the visibility pod including at least one resource to execute at least one monitoring application to analyze data of a copy of network traffic;
causing the copy of the network traffic for the group of networked computing resources to be directed to the visibility pod through a visibility endpoint associated with the visibility pod;
extracting the metadata from the copy of the network traffic;
analyzing the extracted data of the copy of the network traffic from the visibility endpoint to determine one or more behaviors of the monitored network traffic for the group of networked computing resources; and
providing information identifying the one or more behaviors.

7. The computer-implemented method of claim 6, wherein the visibility pod is configured to receive the copy of the network traffic through the visibility endpoint and analyze the data for the network traffic using the at least one monitoring application.

8. The computer-implemented method of claim 6, wherein the at least one monitoring application includes at least one of a threat detection application, a security application, a network analysis application, or a packet analyzer.

9. The computer-implemented method of claim 6, wherein the group of networked computing resources is associated with a user of a resource provider environment including a plurality of shared resources, and wherein the visibility pod is one of a plurality of visibility pods allocated for a plurality of groups of network resources allocated across a plurality of users of the resource provider environment.

10. The computer-implemented method of claim 9, further comprising:
storing information relating to the one or more behaviors to one or more log files or data repositories for subsequent viewing by the user or analysis by a provider of the resource provider environment.

11. The computer-implemented method of claim 6, further comprising:
detecting, based at least in part upon the one or more behaviors, an active security threat relating to the group of networked computing resources; and
storing information for the active security threat that is able to be used to generate an alert for the active security threat.

12. The computer-implemented method of claim 6, wherein the data for the network traffic that is used for the analyzing is metadata including at least one of sender address, sender port, destination address, destination port, communication protocol, communication type, or temporal sequence identifier.

13. The computer-implemented method of claim 6, further comprising:
causing the virtual visibility pod to automatically receive and analyze additional network traffic for one or more additional resources added to the group of networked computing resources.

14. The computer-implemented method of claim 6, further comprising:
providing and configuring the visibility pod using a management service operating in a separate resource environment.

15. The computer-implemented method of claim 6, further comprising:
providing an allocation wizard enabling a user to request allocation of the group of networked computing resources; and
identifying the group of networked computing resources to be monitored based at least in part upon information supplied through the allocation wizard.

16. A system, comprising:
a processor; and
memory including instructions that, when executed by the processor, cause the system to:
identify a group of networked computing resources to be monitored;
automatically allocate, in response to the identification, a visibility pod for the group of networked computing resources, the visibility pod including at least one resource to execute at least one monitoring application to analyze data of a copy of network traffic;
cause the copy of the network traffic for the group of networked computing resources to be directed to the visibility pod through a visibility endpoint associated with the visibility pod;
extracting the data of the copy of the network traffic;
analyze the extracted data of the copy of the network traffic from the visibility endpoint to determine one or more behaviors of the monitored network traffic for the group of networked computing resources; and
provide information identifying the one or more behaviors.

17. The system of claim 16, wherein the visibility pod is configured to receive the copy of the network traffic through the visibility endpoint and analyze the data for the network traffic using the at least one monitoring application.

18. The system of claim 16, wherein the group of networked computing resources is associated with a user of a resource provider environment including a plurality of shared resources, and wherein the visibility pod is one of a plurality of visibility pods allocated for a plurality of groups of network resources allocated across a plurality of users of the resource provider environment.

19. The system of claim 17, wherein the instructions when executed further cause the system to:
store information relating to the one or more behaviors to one or more log files or data repositories for subsequent viewing by the user or analysis by a provider of the resource provider environment.

20. The system of claim 16, wherein the instructions when executed further cause the system to:
detect, based at least in part upon the one or more behaviors, an active security threat relating to the group of networked computing resources; and
log information for the active security threat that is able to be used to generate an alert for the active security threat.

* * * * *